Figure 1:
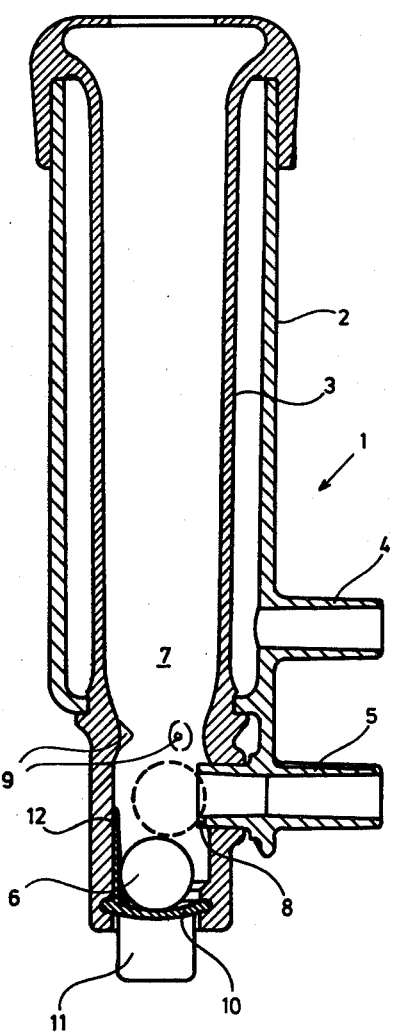

United States Patent [19]

Tonelli

[11] Patent Number: 4,483,272
[45] Date of Patent: Nov. 20, 1984

[54] TEAT CUP FOR A MILKING MACHINE
[75] Inventor: Guido A. Tonelli, Södertälje, Sweden
[73] Assignee: Alfa-Laval AB, Tumba, Sweden
[21] Appl. No.: 471,677
[22] Filed: Mar. 3, 1983
[30] Foreign Application Priority Data
   Mar. 4, 1982 [SE] Sweden .................. 8201338
[51] Int. Cl.³ ........................... A01J 5/08
[52] U.S. Cl. ..................... 119/14.32; 119/14.38; 119/14.47
[58] Field of Search ........... 119/14.38, 14.49, 14.32, 119/14.47

[56] References Cited
   U.S. PATENT DOCUMENTS
   1,159,103 11/1915 Sabroe .................. 119/14.38
   2,986,117 5/1961 Ronaldson ............ 119/14.38

FOREIGN PATENT DOCUMENTS
   129177 9/1948 Australia ................ 119/14.49

Primary Examiner—Hugh R. Chamblee
Attorney, Agent, or Firm—Cyrus S. Hapgood

[57] ABSTRACT

A teat cup for a milking machine is provided with a liner (3) arranged within the teat cup and with connections (4, 5) for pulsating vacuum and milk transport vacuum. The teat cup has also a valve means in its lower part, which valve means is arranged to open and close a connection between the inner of the teat cup and the milk flow line.

The valve means is arranged such that when the valve body is in the position where the connection is open, the through flow for the milk is unobstructed.

10 Claims, 2 Drawing Figures

TEAT CUP FOR A MILKING MACHINE

The present invention relates to a teat cup which is provided with a teat cup liner within the teat cup and connection pieces for pulsating vacuum and milk transporting vacuum and a valve means which is arranged to open and close the connection between the inner of the teat cup and the milk flow line.

A teat cup with a rather complicated valve means which closes the connection if the teat cup falls off during the milking, is described for example in the Swedish patent specification No. 159 259. The valve is controlled by means of a ribbon which extends out through the upper opening of the teat cup. The valve body which closes the bottom opening of the teat cup consists of a concave disc of rubber, on which is fastened three conically spiral, resilient strips, which are fastened on a flange in the lower part of the teat cup. The valve body is manually lifted away from the bottom opening of the teat cup when the milking shall start. If a teat cup falls off the disc immediately blocks the bottom opening of the teat cup. A teat cup of the proposed type is not suitable, since milk rests may stick to pockets in the valve means.

Also in British patent specification GB No. 737 834 there is described a teat cup which is provided with a valve means which automatically hinders large amounts of air to be sucked into the milk flow line. The valve means works vertically in the teat cup and its valve body, a piston, abuts in its lower part against a valve seat. The piston is provided with a small hole through the piston. The valve means is also provided with resilient means which aims at lifting the piston away from the valve seat. Should the teat cup fall off during the milking air rushes in and the valve body is forced against its seat and closes the connection to the milk flow line. When the teat cup is attached to the cow again, the space around the teat is evacuated and the piston is urged away from the valve seat by means of the spring force and the milking may continue.

The teat cup which is known through the British patent specification has, however, a number of disadvantages. The valve body is situated in the middle of the milk flow and hinders the same. The milk is collected in the cup shaped upper part of the piston and not until this has been filled the milk can pass through the space between the wall of the teat cup and the piston. Should the opening through the piston be stopped up the valve means no longer opens automatically. The usual cleaning after the milking becomes very difficult with such a teat cup since the piston and the springs owing to their shape are very difficult to clean.

According to the invention there is now proposed a new teat cup which is mainly characterized in that the valve means is arranged such that, when the valve body is in the position where the connection between the inner of the teat cup and the milk flow line is open, the through flow for the milk is unobstructed. The teat cup is with advantage designed such that at least the same area as the cross section area of the connection piece is available for the milk when passing the valve body. It is very essential that there is a free flow for the milk in the teat cups since every restriction causes vacuum fluctuations which may disturb the milking.

In the proposed teat cup the valve housing consists of the teat cup liner. This means a simple design without complicated separate parts which must be mounted together.

The valve means is with advantage arranged to open the connection mentioned above after an adjustment of the vacuum between the inner of the teat cup and the milk flow line. To use vacuum to achieve the automatic opening implies a secure function of the valve means, since the milk transporting vacuum itself causes the opening. This adjustment of the vacuum between the inner of the teat cup and the milk flow line takes place through a little passage in the tightening surface between the valve body and the valve seat. Of course it is also possible to arrange this passage as a separate connection, but if the passage is located to the tightening surface there is also obtained a self-rinsing effect, which achieves that the wanted opening always takes place.

The valve body is with advantage designed with a spherical part arranged to abut against a circular valve seat which consists of a part of the teat cup liner or the teat cup. In one preferred embodiment the valve body consists of a ball and the valve seat consists of the connection piece to the milk flow line. A valve body in the form of a ball implies great advantages from a hygienic standpoint.

In order to obtain the desired free flow for the milk there is a space for the valve body in the teat cup liner, when the valve body is in the position where the connection is open. This space may be situated below the connection piece.

In order to obtain the desired opening the teat cup is designed such that the movement of the valve body to the position where the connection is open takes place under influence of a force which works in the opening direction of the valve body. This force may consist for example of the gravity or a magnetic force.

In order to secure the free flow for the milk the connection piece of the milk flow line may be arranged at an angle to a longitudinal line through the teat cup. Of course it is also possible to arrange the valve means such that it may be opened and closed manually.

Figure 2:
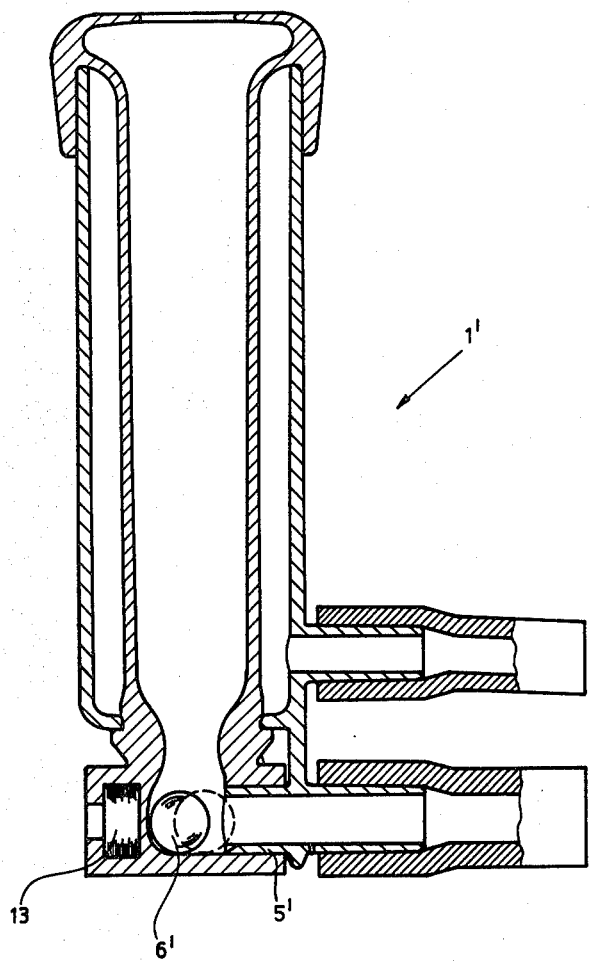

The invention will be described further with reference to the attached drawing,

FIGS. 1 and 2 of which show two examples of teat cups according to the invention.

In FIG. 1 there is shown a teat cup comprising a casing 2, in which there is a liner 3. The teat cup has also connection pieces 4, 5 to pulsating vacuum and the milk flow line (the milk transport vacuum). In the bottom of the teat cup there is a valve means in the shape of a ball 6, which in the closed position abuts against a valve seat in the shape of the connection piece 5 to the milk flow line. In the position where the valve closes the connection between the inner 7 of the teat cup and the milk flow line the ball is situated in the position shown with a dashed line on the drawing. Between the ball 6 and the valve seat there is a passage 8, which passage consists of a groove in the connection piece. Below the connection piece 5 there is a space in the liner for the ball. The liner is also provided with small projections above the connection piece. These projections 9 should hinder the ball to fall out from the teat cup if the same should be turned upside down. In the bottom of the teat cup there is a movable bottom plate 10. This plate which is provided with a small handle 11 carries a peg 12 on its upper part.

When the milking shall start the milking machine and the milk transport line is connected to a stationary pipe line, which in its turn is connected to a vacuum pump.

The ball 6 is sucked against the connection piece as soon as vacuum prevails in the milk flow line and it is only through the passage 8 that atmospheric air may be sucked into the milk flow line. The milker attaches the teat cups to the teat, at which the space under the teat very soon is evacuated through the passage 8 such that an adjustment to the milking vacuum is obtained in the inner of the teat cup. The ball 6 then falls down to the bottom of the teat cup and the milk may be transported away through the milk flow line. During the milking the ball rests on the bottom of the teat cup, but if the teat cup for some reason should fall away from the teat cup during the milking, the ball 6 immediately closes the connection to the milk flow line, at which there is obtained that no air or particles such as dust are sucked into the milk. The projections on the teat cup certify that the ball cannot fall out through the upper opening of the teat cup.

The teat cup shown in FIG. 2 has also a valve body in the shape of a ball $6^1$, but in this case the movement of the ball in the opening direction takes place under influence of a magnet 13. The ball $6^1$ is, as has been described above, sucked to the connection piece $5^1$ when vacuum prevails in the milk flow line. When the teat cup has been attached to the teat the adjustment of vacuum between the inner of the teat cup and the vacuum in the milk flow line takes place and the ball is drawn away from the valve seat by the magnetic force. If the teat cup should fall off during the milking the turbulence in the teat cup will be so large when air rushes in into the teat cup that the magnetic influence on the ball diminishes and the ball is sucked to the connection piece. In this design of the teat cup the ball is hindered from falling off the teat cup by providing the teat cup liner with a thickening above the connection piece. In these two designs of the proposed teat cup the connection piece to the milk flow line is suitated below the pulsating vacuum line and extends at a right angle to the longitudinal axis of the teat cup. Of course some other angle may be chosen if that is suitable.

The movable bottom plate 10 of the teat cup according to FIG. 1 is located in the way shown in this figure during the milking. When the milking is ended and the cleaning shall start the bottom plate is moved such that the small peg is situated outside the opening of the connection piece 5. This means that even when cleaning fluid rushes into the teat cup, the ball cannot close the opening of the connection piece. A closing should mean that the cleaning could not take place in a proper way. By exchanging the peg for a disc which extends such that it covers the opening of the connection piece it is possible to obtain a forced closing of the connection.

In the embodiment of the invention which has been described above the valve body has the shape of a ball. Of course it is possible to give the valve body some other form, as for example a piston-like body with an extension also out from the teat cup. The valve body is then lifted away from the valve seat after an adjustment of the vacuum depending on the lifting force on the valve body and its extension due to the pressure difference between atmospheric pressure and pressure within the teat cup being larger than the weight of the valve body. Should the teat cup fall off the pressure conditions are equalized, such that the valve body falls down and closes the connection between the inner of the teat cup and the milk flow line. With such an arrangement it is possible to close the connection between the inner of the teat cup and the milk flow line manually by means of the extension of the valve body if that should be desirable.

I claim:

1. A teat cup for a milking machine which comprises a casing, a liner within the casing and forming therewith a pulsation chamber, the liner having a teat-receiving opening at its upper end, a first connection piece for connecting said chamber to a pulsating vacuum, a second connection piece for connecting the interior of the liner to a milk-transport vacuum, a valve seat through which said second connection communicates with the interior of the liner at its lower portion, the lower end of the teat cup defining a valve housing, and a movable valve body in the housing normally held in a displaced position from said seat but located for movement into a closing position where it is held against said seat by a vacuum in said second connection piece creating a rush of air through said liner opening, the valve body in said displaced position leaving an unobstructed passage for flow of milk through the liner to said second connection piece, there being a bleed passage between said second connection piece and the interior of the liner for adjustment of the vacuum within the liner while the valve body is in said closing position, whereby said body returns to its displaced position.

2. The teat cup of claim 1, in which the throughflow area of said unobstructed passage is at least as great as the throughflow area of said second connection piece.

3. The teat cup of claim 1, in which the valve body has a spherical part engageable with said seat, said seat being formed by said second connection piece.

4. The teat cup of claim 1, in which said casing and liner have a longitudinal axis, said second connection piece extending at an angle to said axis.

5. The teat cup of claim 1, in which said valve housing is defined by the liner.

6. The teat cup of claim 1, in which said bleed passage is located in one of said seat and valve body.

7. The teat cup of claim 1, in which said valve housing is located below said second connection piece.

8. The teat cup of claim 7, in which the valve body is held in said displaced position by gravity.

9. The teat cup of claim 1, in which said valve housing is substantially at the level of said second connection piece.

10. The teat cup of claim 9, comprising also means biasing the valve body toward its displaced position.

* * * * *